Dec. 2, 1924.
P. J. FINLAN
PIE PLATE LIFTER
Filed Jan. 8, 1924
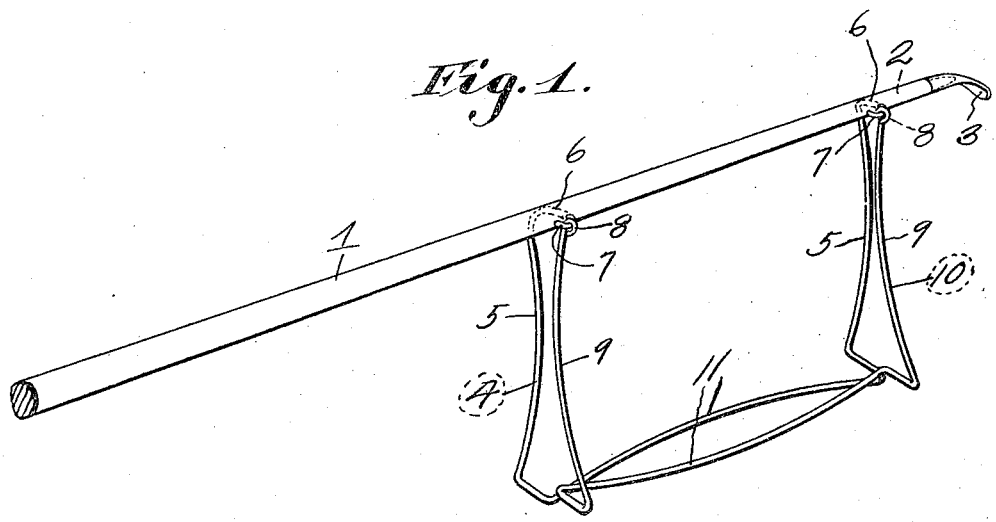
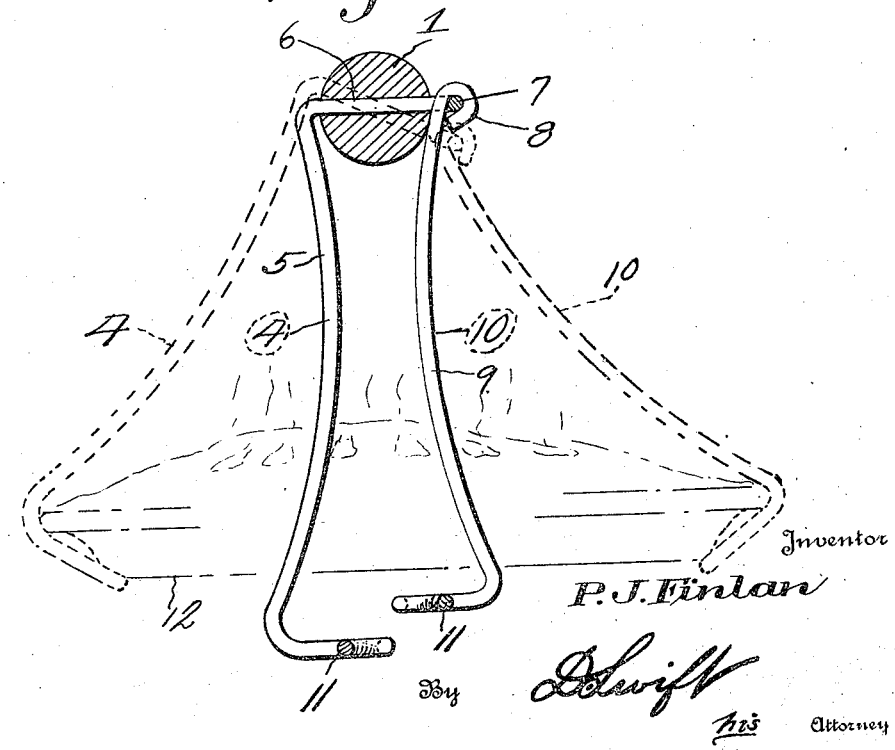
Inventor
P. J. Finlan
By D. Swift
his Attorney Patented Dec. 2, 1924.

1,517,974

UNITED STATES PATENT OFFICE.

PATRICK J. FINLAN, OF AUSTIN, OREGON.

PIE-PLATE LIFTER.

Application filed January 8, 1924. Serial No. 685,003.

*To all whom it may concern:*

Be it known that I, PATRICK J. FINLAN, a citizen of the United States, residing at Austin, in the county of Grant, State of Oregon, have invented a new and useful Pie-Plate Lifter; and I do hereby declare the following to be a full, clear, and exact description of the invention, such as will enable others skilled in the art to which it appertains to make and use the same.

The invention relates to pie plate lifters and has for its object to provide a device of this character having an elongated handle member having a fixed U-shaped member and a pivoted bail adapted to engage under opposite sides of a pie plate whereby said plate may be lifted and removed from an oven.

A further object is to provide the fixed U-shaped member with arms extending through the handle member and terminating in bent portions on opposite sides of the handle member thereby forming eyes to which the pivoted bail is pivotally connected.

A further object is to provide the end of the handle member with a hook adapted to engage a pie plate whereby the pie plate may be moved to various positions or to a position where it may be easily engaged by the U-shaped member and the pivoted bail, for lifting the plate.

A further object is to provide the transverse portions of the U-shaped frame and bail with opposed bends, thereby forming concaved surfaces for engaging opposite sides of a pie plate and preventing lateral slipping of the pie plate.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the lifter.

Figure 2 is a vertical transverse sectional view through the lifter, showing the parts in dotted lines when the device is applied to a pie pan.

Referring to the drawing, the numeral 1 designates an elongated handle member of the device, which handle member may be of any length, however it is preferably long so that it may be easily inserted in large ovens of the bakery type. The end 2 of the handle member is provided with a hooked arm 3, which is adapted to hook over or under a pie plate in an oven, thereby allowing the operator to move the pie plates in the oven to various positions, for instance a pie plate in the rear of the oven to a position adjacent the front thereof for removal purposes, or to arrange pie plates in an oven.

Depending from the handle member 1 is a rigid U-shaped frame 4, which frame has its arms 5 secured to the handle member 1 by means of angularly disposed arms 6, which extend transversely through the handle member and are bent to form eyes 7 on the opposite side of the handle member, in which eyes are pivotally mounted the eyes 8 carried by the arms 9 of the U-shaped frame 10, therefore it will be seen that the device is simply constructed and the same securing means is used for the U-shaped member 4 and the pivoted U-shaped member 10, consequently the cost of manufacture is reduced to a minimum. The transverse portions 11 of the U-shaped members 4 and 10 are outwardly bowed so that they will conform to the contour of the opposite sides of a pie plate 12 during a plate lifting operation and consequently the pie plate will be held against longitudinal lateral displacement. When it is desired to apply the lifter to a pie plate, the transverse portions 11 of one of the U-shaped members 4 or 10, is placed in engagement with one side of the plate 12, however the portion 11 of the U-shaped member 10 is preferably used. After this operation the handle member 1 is partially rotated in the hand and the transverse portion 11 of the other U-shaped member positioned in engagement with the opposite side of the pie plate, after which the plate may be easily lifted from its position.

From the above it will be seen that a pie plate lifter is provided which is simple in construction, and one wherein means for securing the fixed U-shaped frame to the handle member is also utilized for pivotally connecting the other U-shaped frame to the handle member, thereby reducing the cost of manufacture to a minimum.

The invention having been set forth what is claimed as new and useful is:—

A pie plate lifter comprising an elongated handle member, a U-shaped frame, integral arms carried by said U-shaped frame, said arms terminating in angularly disposed integral portions extending transversely through the handle member, the ends of said angularly disposed integral portions terminating in eyes on one side of the handle member, a second U-shaped frame, arms carried by the second U-shaped frame and terminating eyes, said eyes being pivotally connected by the eyes carried by the ends of the angularly disposed integral portions.

In testimony whereof I have signed my name to this specification in the presence of two subscribing witnesses.

PATRICK J. FINLAN.

Witnesses:
D. J. HUGHES,
DAN W. FISK.